United States Patent [19]

Nagase

[11] 4,219,190
[45] Aug. 26, 1980

[54] GAS SPRING

[75] Inventor: Toshiro Nagase, Sagamihara, Japan

[73] Assignee: Tokico Ltd., Kanagawa, Japan

[21] Appl. No.: 950,618

[22] Filed: Oct. 12, 1978

[30] Foreign Application Priority Data

Oct. 20, 1977 [JP] Japan .................... 52-125934

[51] Int. Cl.² ............................................. F16F 9/43
[52] U.S. Cl. .................................... 267/65 R; 141/4;
188/352
[58] Field of Search ............................. 267/64 R, 65 R;
188/269, 322, 352, 281; 141/4

[56] References Cited

U.S. PATENT DOCUMENTS

| 3,361,422 | 1/1968 | Theuleau | 188/281 |
| 3,927,871 | 12/1975 | de Baan | 267/65 R |
| 4,044,866 | 8/1977 | Ishida | 267/64 R |

FOREIGN PATENT DOCUMENTS

| 1218806 | 6/1966 | Fed. Rep. of Germany | 267/65 R |
| 47-48832 | 12/1972 | Japan | 267/65 R |

Primary Examiner—Edward R. Kazenske
Attorney, Agent, or Firm—Wenderoth, Lind & Ponack

[57] ABSTRACT

A gas spring includes a cylinder, a piston working in the cylinder, a piston rod with one end secured to the piston and another end extending out of the cylinder through one end thereof, and a seal ring slidably disposed in the cylinder and slidably and sealingly engaging with the piston rod. A gas passage is formed between the seal ring and the piston rod when the seal ring and the piston rod are positioned at a predetermined positional relationship. A seal supporting member is provided to prevent displacement of the seal ring toward the piston when the gas passage has been formed.

6 Claims, 9 Drawing Figures

GAS SPRING

BACKGROUND OF THE INVENTION

This invention relates to a gas spring and, particularly, to a gas spring of the type wherein it is possible to fill gas into the gas spring safely and reliably during manufacturing or repairing processes, and which has a simple construction.

Conventional gas springs comprise a cylinder, a piston working in the cylinder, a piston rod secured to the piston at one end thereof and extending out through one end of the cylinder, and a rod guide disposed at one end of the cylinder for slidably guiding the piston rod therethrough.

One prior art gas spring of the aforementioned kind comprises, such as shown in Japanese patent disclosure (Kokai Koho) No. 52-70416, a seal ring being disposed adjacent to and inwards of the rod guide for sealingly engaging the piston rod and the cylinder, and a reduced diameter portion being formed on the piston rod, whereby when the seal ring is located radially outwards of the reduced diameter portion a gas passage is formed between the seal ring and the piston rod thus enabling gas under pressure to be filled into the cylinder at a high speed.

In such case when gas under pressure is filled into the cylinder the seal ring and the rod guide have sometimes been displaced inwardly of the cylinder or towards the piston, depending on the pressure and velocity of the gas being filled into the cylinder, since, in particular, in the initial stage of the gas filling process, pressure in the cylinder is substantially lower than that of the compressed gas, and the gas filling passage has sometimes been restricted or, in the extreme case, closed due to displacement of the seal ring passing over the reduced diameter portion to engage with a large diameter portion of the piston rod. Therefore, there is problems such that compressed gas cannot be filled reliably into the cylinder.

SUMMARY OF THE INVENTION

An object of the present invention is to provide a gas spring of the aforementioned type but which solves the aforementioned problems.

According to the invention there is provided a gas spring comprising a cylinder, a piston working in the cylinder, a piston rod being secured to the piston at one end thereof and extending out through one end of the cylinder, a seal ring slidably disposed in the cylinder and engaging slidably with the piston rod, a gas passage being adapted to be formed between the seal ring and the piston rod when the seal ring is positioned at a predetermined positional relationship with respect to the piston rod, and a seal supporting member for restricting displacement of the seal ring toward the piston when the gas passage has been formed.

BRIEF DESCRIPTION OF THE DRAWINGS

Further objects and advantages of the present invention will be apparent from the following description taken in conjunction with the drawings, in which.

DETAILED DESCRIPTION OF PREFERRED EMBODIMENTS

Figure 1:
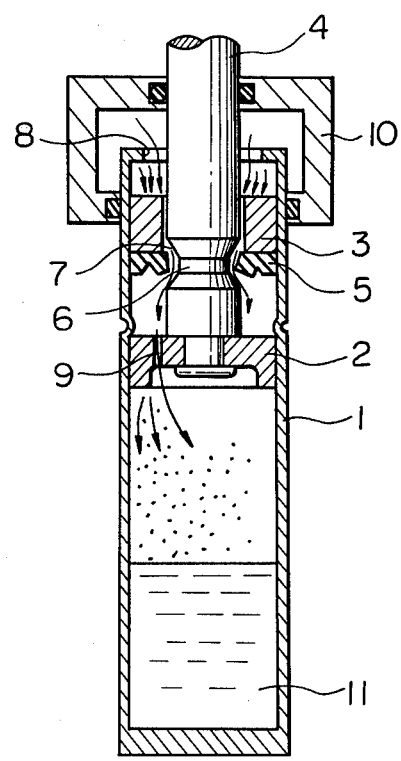
FIG. 1 is a longitudinal sectional view of a prior art gas spring and showing the parts in position for carrying out the gas filling operation.

In one prior art gas spring shown in FIG. 1, a piston 2 is slidably disposed in a cylinder 1 and is shown positioned at the upper end of its stroke for carrying out the gas filling operation. A piston rod 4 includes a reduced diameter portion 6 in the region of the lower end thereof. The piston 2 is secured to the lower end of the rod 4, and rod 4 projects outwardly of the cylinder 1 through a rod guide 3 and a seal ring 5. In carrying out the gas filling operation the seal ring 5 is positioned radially outward of the reduced diameter portion 6 of the piston rod 4 so as to form a gas passage 7 therebetween. Then, the upper end portion of the cylinder 1 is sealingly enclosed by a high pressure gas chamber 10, and high pressure gas is filled into the cylinder 1 through an opening 8 formed in the upper end of the cylinder 1, a radial clearance between the rod guide 3 and the piston rod 4, and the passage 7. However, in the initial stage of the gas filling operation the pressure in the cylinder 1 is substantially lower than that in the high pressure chamber 10 so that the rod guide 3 and the seal ring 5 are sometimes displaced inward of the cylinder according to a differential pressure acting across the rod guide 3 and to the velocity of the gas flowing at a high speed, whereby the seal ring 5 moves from reduced diameter portion 6 and engages with a large diameter portion of the piston rod 4, thus closing the passage 7. Therefore, there is a problem that the gas filling operation cannot reliably be performed.

Incidentally, shown at 9 in the drawing is a passage formed through the piston 2, and at 11 a liquid filled in the bottom portion of the cylinder 1.

The present invention provides a gas spring solving the problem aforementioned, and four embodiments of the invention are shown in FIGS. 2 through 9, in which, parts corresponding to FIG. 1 are denoted by corresponding numerals with a prime.

Figure 2:
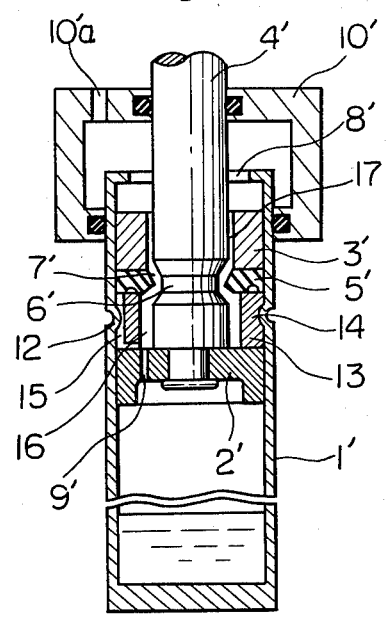
FIG. 2 is a longitudinal sectional view similar to FIG. 1 but showing a gas spring according to the present invention.
Figure 5:
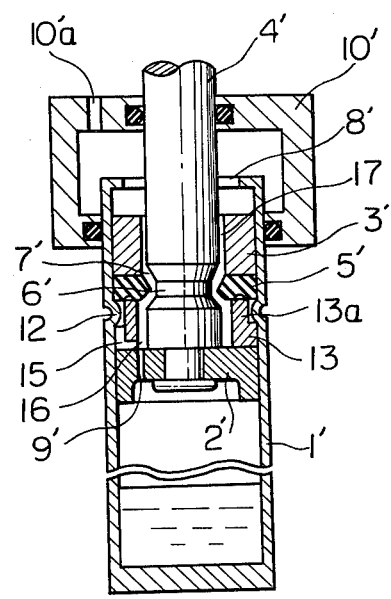
FIG. 5 is a view similar to FIG. 2 but showing a modified form.
Figure 3:
FIG. 3 is a view showing a retaining member which may be incorporated in the gas spring of FIG. 2.
Figure 6:
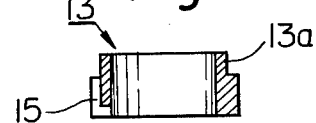
FIG. 6 is a view showing a retaining member which may be incorporated in the gas spring of FIG. 5.
Figure 4:
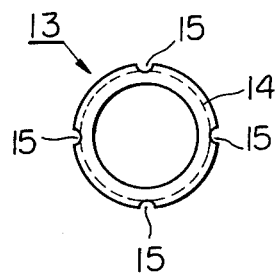
FIG. 4 is a plan view of the retaining member of FIG. 3.
Figure 7:
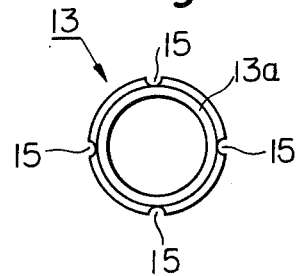
FIG. 7 is a plan view of the retaining member of FIG. 6.

In the first embodiment shown in FIGS. 2-4, there is provided a cylindrical seal supporting member 13 secured in cylinder 1' by means of an annular or a plurality of circumferentially spaced projections 12 projecting inwardly from the inner wall of the cylinder 1'. It will be noted that the prior art device shown in FIG. 1 also includes a similar projection or projections for abutting with the piston 2 when the piston is in its uppermost position. The seal supporting member 13 has an annular groove 14 and a plurality of axially extending grooves 15 as shown in FIGS. 3 and 4 in its outer periphery, and the grooves 15 communicate respectively with radially extending grooves formed in the bottom surface of the seal supporting member 13 and act as gas passages as explained in detail hereinafter.

The seal supporting member 13 has the upper surface thereof adapted to engage with a substantial portion of the lower surface of seal rings 5' so as to prevent the seal ring 5' from defecting downward during filling of high pressure gas into the cylinder 1'. Also, the seal supporting member 13 acts as a stop for engaging with piston 2' when the piston is in its uppermost position. At that condition, an annular space 16 is formed between the inner circumference of the seal supporting member 13 and the piston rod 4', and gas passage 7' is formed between the seal ring 5' and reduced diameter portion 6' of the piston rod 4'.

In carrying out the gas filling operation, the gas spring takes the position shown in FIG. 2, i.e., the piston 2' is located in its uppermost position engaging with the seal supporting member 13 and the upper portion of the gas spring is enclosed sealingly in high pressure chamber 10'. Then, gas under high pressure is introduced into the chamber 10' through passage 10'a. The high pressure gas passes through opening 8' formed in the upper end of the cylinder 1', acts on the upper surface of rod guide 3' to slidably move the rod guide 3' and the seal ring 5' downward so as to engage the seal ring 5' with the seal supporting member 13 thus forming the gas passage 7', and passes through a clearance 17 formed between the rod guide 3' and the piston rod 4', the gas passage 7', the space 16 and passage 9' formed through the piston 2' and, is introduced into the cylinder 1'. The seal supporting member 13 supports the seal ring 5' and the rod guide 3' in the downwardly displaced position shown in FIG. 2 and prevents the inner circumferential edge of the seal ring 5' from deflecting in the downward direction thereby preventing the gas passage 7' from being reduced in passage area or from being closed. Therefore, gas filling operation can be performed smoothly and reliably.

After a predetermined amount of high pressure gas has been filled into the cylinder 1' the high pressure chamber 10' is removed from the cylinder 1'. Then, the high pressure gas will tend to flow out of the cylinder 1' through the passages 7', the clearance 17 and the opening 8'. However, the seal ring 5' and the rod guide 3' will displace toward the opening 8' and the seal ring 5' will engage with a large diameter portion of the piston rod 4' thus closing the passage 7'. Preferably, the piston 2' is firstly moved downward so as to close the passage 7' and, thereafter, the high pressure chamber 10' is removed from the cylinder 1', whereby, any of the predetermined amount of high pressure gas filled into the cylinder 1' can be prevented from leakage. Incidentally, the gas passage 15 formed in the outer peripheral surface of the seal supporting member 13 enables gas pressure in the cylinder 1 to act uniformly on the inner surface of the seal ring 5', thus, the seal ring 5' and the rod guide 3' slide smoothly along the inner surface of the cylinder 1' and the seal ring 5' engages sealingly with the outer surface of the piston rod 4' and also with the inner surface of the cylinder 1.

In the embodiment described the seal supporting member 13 is secured to the cylinder 1', but the seal supporting member need not necessarily be secured to the cylinder. In the second embodiment of the present invention shown in FIGS. 5-7, a seal supporting member 13 is secured to the upper surface of the piston 2', with a cylindrical portion 13a being formed in the upper portion of the member 13. The outer diameter of portion 13a is smaller than the inner diameter of the annular projection 12 of the cylinder 1'. The lower portion of the member 13 has an outer diameter corresponding to the inner diameter of the cylinder 1', and a radial step formed between the upper portion 13a and the lower portion of the member 13 engages with the annular projection 12 to restrict the upward movement of the piston 2.

Figure 8:
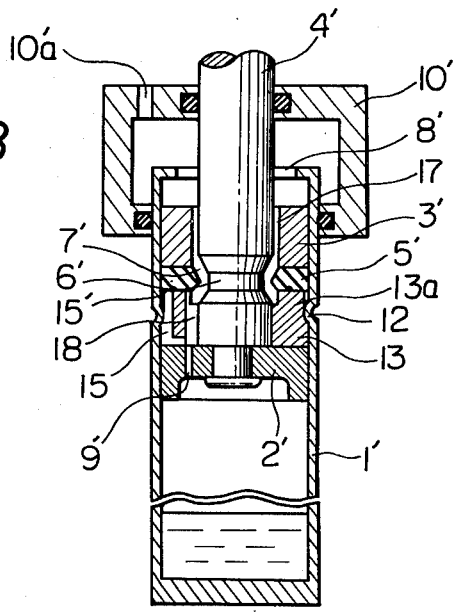
FIG. 8 is a view similar to FIG. 2 but showing a further modified form.

Another embodiment of the present invention shown in FIG. 8 comprises a seal supporting member 13 with an inner diameter portion fitted tightly on the piston rod 4' and an inner end surface abutting the upper surface of the piston 2'. A groove acting as a gas communicating passage 18 connecting the gas passage 7' and the hole 9' is formed in the inner diameter portion of the member 13. The passage 18 communicates also with a gas passage 15 formed in the outer peripheral surface of the member 13 for uniformly applying gas pressure in the cylinder 1' on the inner surface of the seal ring 5'.

In the second and the third embodiment of FIGS. 5-8 the seal supporting member 13 is secured to the piston or the piston rod, and thus, the seal ring 5' can reliably and easily be located, during the gas filling operation, at a position radially outward of the reduced diameter portion. Therefore, it is possible to smoothly and reliably perform the gas filling operation.

Figure 9:
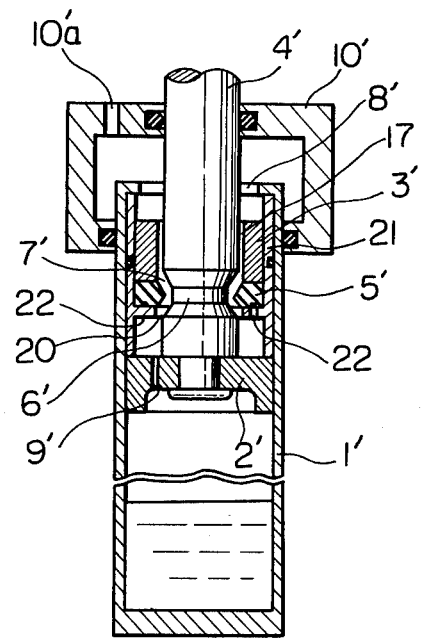
FIG. 9 is a view showing a still further modified form.

The fourth embodiment of the present invention shown in FIG. 9 comprises a seal supporting member in the form of a sleeve or a cylindrical body 21 having an inwardly projecting radial flange 22 in the middle portion of its length. The supporting member is sealingly fitted and secured to the upper end of the cylinder 1' and receives slidably therein the rod guide 3' and the seal ring 5'. In this case, the annular projection 12 may be omitted, and thus, the strength of the cylinder 1' will not be impaired. Further, the rod guide 3' and the seal ring 5' are slidably supported in the seal ring supporting member and not in the cylinder 1' directly, and thus the cost for machining and finishing the inner surface of the cylinder 1' can be minimized. Incidentally, a plurality of small holes are formed in the flange 22 to uniformly apply gas pressure on the lower surface of the seal ring 5'.

As described heretofore in detail, the gas spring according to the present invention comprises a seal supporting member for restricting displacement of the seal ring toward the piston when a gas passage has been formed between the seal ring and piston rod. Thus, in filling high pressure gas into the cylinder 1', it is possible to prevent the shortcoming of prior art gas springs wherein the seal ring displaces toward the piston, thus reducing the area of the gas passage formed between the seal ring and the piston rod. Therefore it is possible to easily and reliably perform the gas filling operation.

I claim:

1. A gas spring comprising:
   a cylinder adapted to have filled therein a gas;
   a piston slidably disposed within said cylinder;
   a piston rod having a first end connected to said piston and a second end extending outwardly through an end of said cylinder;
   said piston rod including a reduced diameter portion at a position adjacent said piston and increased diameter portions on axially opposite sides of said reduced diameter portion;
   a seal ring positioned within said cylinder at a location between said piston and said end of said cylinder, said seal ring being capable of axial displacement with respect to said cylinder;

said seal ring having an inner circumference dimensioned to be spaced from said reduced diameter portion of said piston rod, to define therebetween a filling gas passage, when said seal ring and said piston rod are positioned in a predetermined positional relationship to enable gas to be filled through said end of said cylinder and said gas passage into said cylinder;

said inner circumference of said seal ring being dimensioned to seal against an axially outer one of said increased diameter portions of said piston rod after completion of filling said gas into said cylinder; and seal ring supporting means for preventing said inner circumference of said seal ring, when said seal ring and said piston rod are positioned in said predetermined positional relationship during filling of said gas, from being deflected axially inwardly against an axially inner one of said increased diameter portions of said piston rod, and from thereby closing said gas passage during said filling, said seal ring supporting means comprising a member positioned within said cylinder between said piston and said seal ring, a portion of said member being positioned radially outwardly of at least a part of said reduced diameter portion of said piston rod.

2. A gas spring as claimed in claim 1, wherein said member is annular and is fixed to the interior of said cylinder at a position to limit the extent of axially outward displacement of said piston with respect to said cylinder and the extent of axially inward displacement of said seal ring with respect to said cylinder.

3. A gas spring as claimed in claim 1, wherein said member is fixed to said piston.

4. A gas spring as claimed in claim 1, wherein said member is fixed to said piston rod.

5. A gas spring as claimed in claim 1, wherein said member has on the radially outer periphery thereof at least one axially extending groove means for enabling gas filled into said cylinder during the filling operation to act on said seal ring and move said seal ring axially of said cylinder to cause said inner circumference of said seal ring to seal against said axially outer one of said increased diameter portions of said piston rod.

6. A gas spring as claimed in claim 1, wherein said member comprises a cylindrical member having an axially outer end fixed to said end of said cylinder, a radially inwardly extending flange, and a cylindrical skirt extending axially inwardly of said cylinder from said flange, said cylindrical member slidably receiving therein said seal ring, and said flange restricting axial inward displacement of said seal ring.

* * * * *